United States Patent [19]

Coggiola et al.

[11] Patent Number: 4,741,482
[45] Date of Patent: May 3, 1988

[54] MAGNETIC SAFETY SWITCH DEVICE FOR FOOD PROCESSOR

[75] Inventors: Marcel Coggiola, Le Perreux; Patrick Ribassin, Fontenay sous bois; Manuel Gallardo, Chelles; Jean Meyer, Cormelles le Royal; Alain J. L. Bertin, Chelles, all of France

[73] Assignee: Robot-Coupe S.A., Vincennes, France

[21] Appl. No.: 552,016

[22] Filed: Nov. 17, 1983

Related U.S. Application Data

[63] Continuation of Ser. No. 177,850, Aug. 14, 1980, abandoned.

[30] Foreign Application Priority Data

Aug. 29, 1979 [FR] France .............................. 79 21651
Dec. 19, 1979 [FR] France .............................. 79 31062

[51] Int. Cl.4 .............................................. B02C 18/12
[52] U.S. Cl. ...................................... 241/37.5; 241/92; 241/282.1; 241/282.2
[58] Field of Search ............... 241/36, 37.5, 92, 282.1, 241/282.2, 301, 199.12; 361/203

[56] References Cited

U.S. PATENT DOCUMENTS

| 2,740,019 | 3/1956 | Kueser | 200/138 |
| 3,612,126 | 10/1971 | Emmons et al. | 146/68 |
| 3,892,365 | 7/1975 | Verdun | 241/92 |
| 3,957,215 | 5/1976 | Otto et al. | 241/282.1 |
| 3,985,304 | 10/1976 | Sontheimer | 241/92 |
| 4,216,917 | 8/1980 | Clare | 241/37.5 |
| 4,371,118 | 2/1983 | Sontheimer et al. | 241/30 |

FOREIGN PATENT DOCUMENTS

| 1111348 | 7/1961 | Fed. Rep. of Germany . |
| 1198316 | 8/1965 | Fed. Rep. of Germany . |
| 408975 | 1/1975 | Japan . |

Primary Examiner—Timothy V. Eley
Attorney, Agent, or Firm—Dewey, Ballantine, Bushby, Palmer & Wood

[57] ABSTRACT

A magnetic safety device, inter alia for a food processor, wherein, when a cover (10) is locked on a bowl (3), which in turn is locked to a base (1), a permanent magnet (12) is brought towards a magnetically controlled working contact (11) connected in series in the supply circuit of a motor (2).

15 Claims, 8 Drawing Sheets

MAGNETIC SAFETY SWITCH DEVICE FOR FOOD PROCESSOR

This application is a continuation of application Ser. No. 177,850, filed Aug. 14, 1980, now abandoned.

DESCRIPTION

The invention relates to a magnetic safety device of use more particularly though not exclusively in a food processor.

Devices of the aforementioned kind conventionally comprise a base enclosing an electric motor having a shaft on which various tools such as knives or scrapers can be mounted. The drive shaft projects into a bowl adapted to enclose the tools and the products which have been or are being processed. In some cases the bowl is removably mounted on the base for ease in cleaning. The bowl is closed by a likewise removable cover, the main purpose of which is to prevent material from being thrown out of the bowl.

The devices have to be fitted with a safety means. They are dangerous because the tools are driven at high speed in the bowl and any contact with a rotating tool may result in serious injury. This need is all the more urgent in that the devices are for use by people without special training.

The safety means must meet two conditions. The motor must be stopped (a) when the bowl is not properly fitted on the base and (b) when the bowl is properly fitted on the base but the cover is not locked on the bowl. The first condition corresponds to the case where the tool is mounted directly on the drive shaft without the bowl. The second condition corresponds to the case where the bowl is in the proper position but the cover is not disposed on it, so that a hand or finger can be inserted during operation. In short, any contact with the rotating tool must be prevented. This result can be obtained by disposing a working contact in the base, the contact being connected in series in the motor supply circuit and being open or closed depending on whether the bowl and cover are properly positioned, i.e. the cover is locked to the bowl and the bowl is locked to the base.

One solution has already been proposed in U.S. Pat. No. 3,892,365 in the name of Pierre Verdun. In this specification, the bowl is secured to the base by a bayonet means which ensures accurate positioning. The cylindrical vessel has a duct extending along a generatrix and enclosing a pusher. The cover is locked in the raised position by stops and a cam bears against the top end of the pusher so that when the cover is locked the pusher is pushed downwards and its bottom end bears against an electromechanical switch, via a hole formed in the base. The aforementioned conditions are fulfilled since the pusher cannot enter the base unless the duct is opposite the hole, i.e. the bowl is properly positioned on the base, and unless the cam bears on the top end of the pusher, i.e. the cover is locked on the bowl.

However, the aforementioned device cannot be considered perfectly reliable since a child, for example, can actuate the working contact by inserting a pointed object into the orifice in the base when the bowl is not in position, thus rotating the drive shaft. When the bowl is in position, it is also possible to start the motor by pressing the top end of the pusher. Finally, there may be difficulties in cleaning and maintaining the pusher, which is pushed upwards by a spring.

The aim of the invention is to obviate the aforementioned disadvantages and construct a safety device which is more reliable.

The invention relates to a magnetic safety device, inter alia for a food processor comprising a base from which a drive shaft extends and is adapted to receive various tools, the processor also comprising a first element detachably mounted on the base and bearing means for securing to the base so as to hold it in a given position, a second element bearing means for locking to the first element in a given position, and a duct extending along a generatrix of the first element so that in the operating position a substantially punctiform region of the base is geometrically in line with the axis of the duct and a point on the second element, characterised in that at least one magnetically controlled contact is disposed in the base and at least one permanent magnet is secured to one of the two elements.

In the preceding patent, the pusher enters the base and thus mechanically transmits the information that the cover has been locked and thus enables the motor to start. In the present invention, by contrast, this information is transmitted by the flux of a magnet, which is not applied to the working relay until all the elements are properly locked. This has an immediate advantage. It is no longer necessary to form a hole in the base, since the base is moulded in non-magnetic plastics. The position of the magnetically controlled contact on the periphery of the base is not visible, as a hole must be. Furthermore the safety device cannot be inactivated unless by a person in possession of a magnet, which greatly reduces the risk of improperly starting the motor.

Other features and advantages of the invention will be clear from the following description of preferred embodiments of the invention, given with reference to the accompanying drawings in which.

Figure 1:
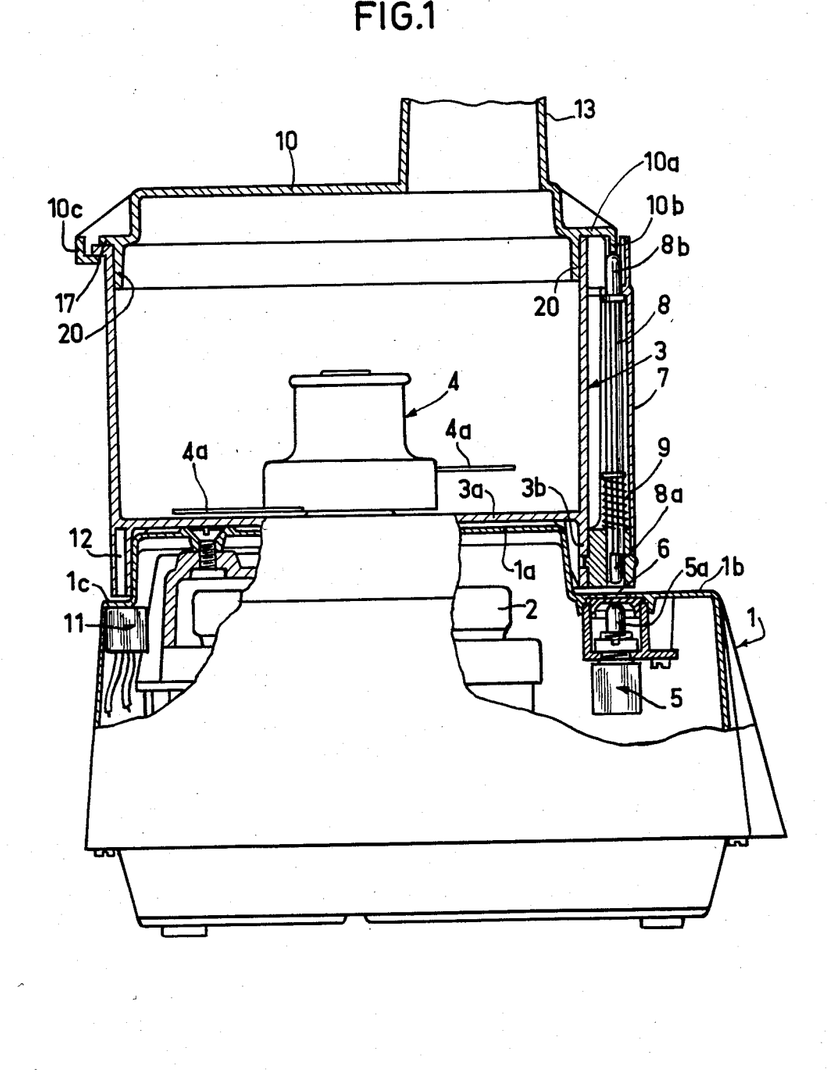
FIG. 1 is a diagrammatic view, partly in section through a vertical plane, of a food processor comprising a rotary tool and equipped with two safety devices, one being mechanical and the other magnetic according to the invention.

In all the Figures, like references denote like elements. FIG. 1 shows a hollow base 1 made e.g. of moulded plastics. It encloses an electric motor 2 mounted so that its axis is vertical and extends through the top wall 1a of the base. Alternatively, the vertical output shaft of a speed reduction gear can extend through wall 1a and its input shaft can be coupled to the output shaft of motor 2, which can be disposed parallel to the bowl. A removable, e.g. cylindrical bowl 3 has a bottom 3a formed with an aperture for the end of the shaft or motor 2 or the output shaft of a speed reduction gear, when the bowl is mounted on base 1 and in FIG. 1. A tool 4 comprising radial knives 4a can be coupled by any appropriate means to the end of the shaft in bowl 3 mounted on base 1. The aforementioned known processor, which comprises a rotary tool, is fitted with a mechanical safety device known from the cited patent. The device mainly comprises a working contact 5 having a control pushbutton 5a and secured inside base 1 above a hole 6 formed in a horizontal flat portion 1b of the base or casing, disposed below a cylindrical skirt 3b which downwardly prolongs the bottom 3a of bowl 3. Hole 6 is disposed so as to be exactly below a duct 7 formed along a generatrix of bowl 3. Duct 7, which is preferably moulded integrally with bowl 3 and made of synthetic material such as polycarbonate, is adapted to receive a pusher 8, preferably made of electrically insulating material. A spring 9, which bears on the bottom of duct 7 and on a central part of rod 8, tends to push rod 8 towards a top position, illustrated in FIG. 1, in which a collar secured to the top part of pusher 8 abuts the top end of duct 7. Pusher 8 is also prolonged at the bottom by a cylindrical actuating means 8a which can engage in hole 6 to actuate the pusher 5a of switch 5. The top end of pusher 8 is prolonged by an actuating means 8b which can co-operate with a slope 10b forming a cam and disposed in a substantially peripheral position on a flange or external projection 10a integrally moulded with cover 10 or secured to the cover by any appropriate means. Cam 10b is disposed so that when cover 10 is brought into a given position by pivoting the skirt 20, cam 10b pushes the pusher 8 downwards, compresses spring 9 and enables the bottom actuating means 8a to engage in hole 6 and thus act on contactor 5.

According to the invention, a second working contact 11 is mounted inside base 1 below a flat part 1c, e.g. diametrically opposite part 1a and substantially at the same level, so as to extend below the cylindrical skirt 3b of bowl 3. A permanent magnet 12, made e.g. of ferrite, is secured to skirt 3b in a position such that it is below the magnetically controlled contact 11, so as to actuate it when bowl 3 is mounted in base 1 in a position such that pusher 8 is exactly above hole 6. According to another feature of the invention, the magnetic working contact 11 and the mechanical working contact 5 are connected in series in the supply circuit of the motor (not shown).

In the case of the device shown in FIG. 1, tool 4 cannot be driven in rotation unless (a) bowl 3 is mounted on base 1 in the correct position for pusher 8 and magnet 12 to be above contact 5 and 11 respectively and (b) cover 10 of vessel 3 is in the proper closure position where its cam 10b actuates pusher 8 so as to compress spring 9. In this position likewise, a flange 10a on the cover engages a stop 17 which prevents any lifting movement of the cover. If the cover is not in position or is improperly closed, the mechanical contact 5 opens the circuit and the motor cannot start. The same happens if bowl 3 is not mounted on the base, since the supply circuit of motor 2 is then also cut by the magnetic contact 11. In the latter case a child, for example, can mount tool 4 on the end of the shaft emerging from the top wall 1a of the base and can actuate pusher 5a of contact 5 by inserting a pointed object into hole 6. This operation, however, is insufficient to cause dangerous rotation of tool 4 since the supply circuit of motor 2 is interrupted by contact 11.

Figures 2, 3:
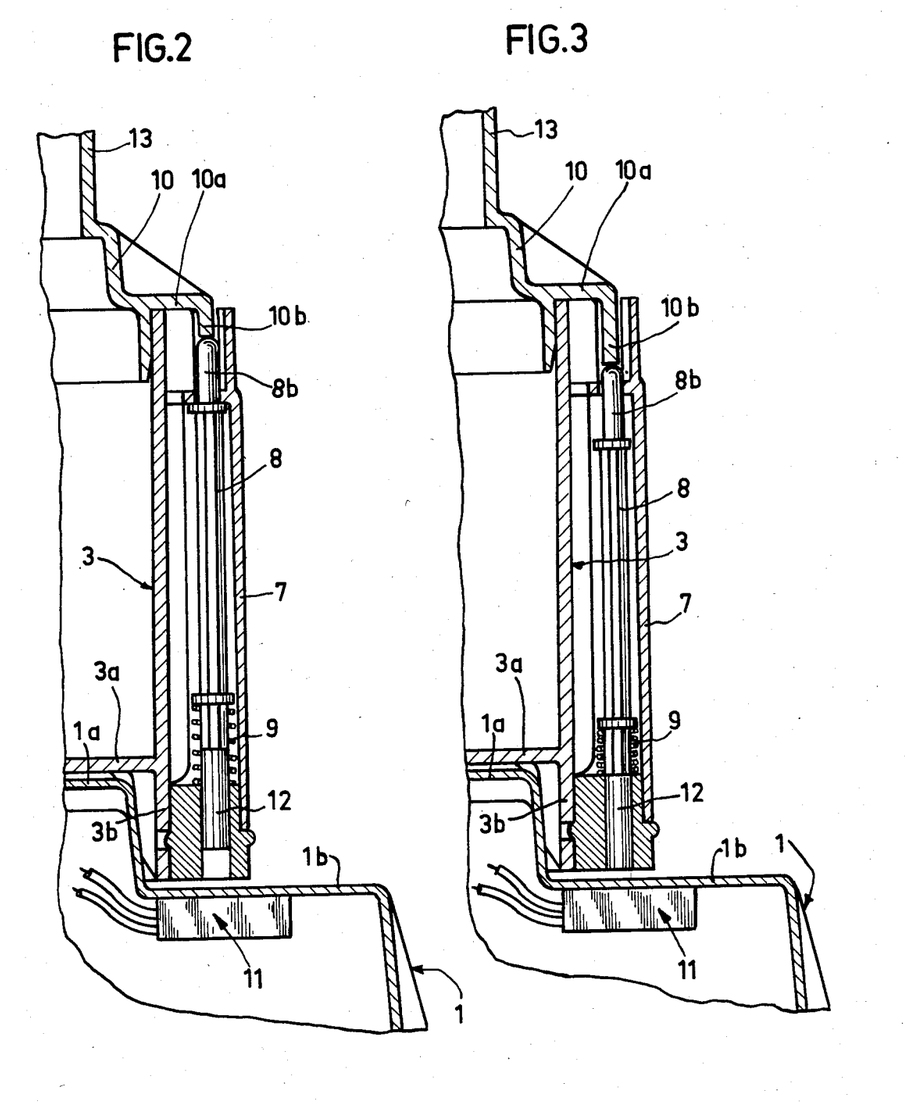
FIGS. 2 and 3 show the two positions of a single magnetically-controlled safety device mounted on a means of the same kind as in FIG. 1.

FIGS. 2 and 3 show the top right part of the device in FIG. 1, equipped with a single magnetically controlled safety device. The only difference between this variant and FIG. 1 is that a magnetically controlled contact 11 is mounted in base 1 below a flat surface 1b which does not have any orifice. A cylindrical permanent magnet 12 is secured to the bottom end of pusher 8. In this case, a single working contact 11 is inserted into the supply circuit of motor 2.

When bowl 3 is not mounted on base 1, contact 11 cannot of course be actuated by the magnet 12 secured to bowl 3, so that no mechanical action on base 1 can start the motor. The same applies when bowl 3 in properly mounted on the base but cover 10 is not closed or is improperly closed. It is only when cover 10 has been rotated into its proper position that cam 10b exerts a downward force on pusher 8 via the top actuating component 8b so as to compress spring 9 and approach the permanent magnet 12 of contact 11 (FIG. 3). It is only then that contact 11 closes so as to supply the electric motor and drive tool 4.

Figure 4:
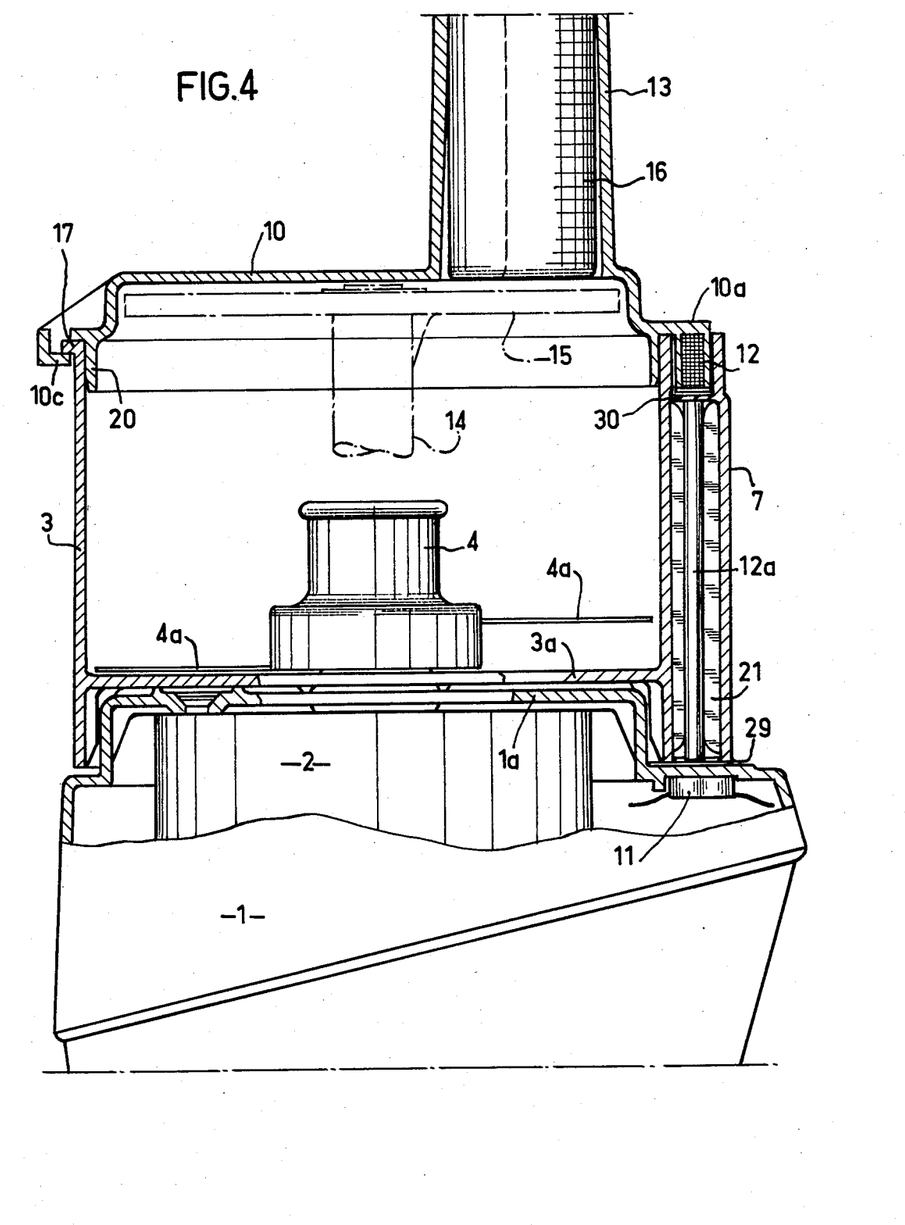
FIG. 4 is a view in section through a vertical plane of another embodiment of the device, in which the magnet is disposed in the cover.

A slightly different embodiment is shown in FIG. 4, which is likewise a vertical section through a food processor. In FIG. 4, the device comprises a magnet 12 secured by any appropriate means to cover 10, and more specifically in a flange 10a in the cover. As before, a magnetic flux must be applied to contactor 11. According to another feature, the magnetic flux is transmitted from magnet 12 to contactor 11 by a rod 12a of ferromagnetic material such as soft iron or ferrite, the rod being mounted in duct 7 and secured inside it. In FIG. 4, the device is in the operating position, i.e. rotation of cover 10 on bowl 3 results (a) in engagement of flange 10c with stop 17, a similar device being provided at flange 10a but not being shown in the cross-section and (b) the permanent magnet 12 is brought above rod 12a which is thus magnetically polarized and transmits the polarization to contact 11, which closes the supply circuit of motor 2. When the cover rotates, guided by the internal skirt 20 which also ensures sealing-tightness, the flanges are released from the stops and thus unlock cover 10 and magnet 12 moves from rod 12a; the magnetic field disappears and the working contact of relay 11 opens and stops the motor.

In order to reduce the air gaps, the ferromagnetic rod 12a, embedded e.g. in plastics in duct 7, comes in contact with a very thin end bottom wall 29 and top wall 30, in order to avoid loss of flux.

A different kind of tool from that previously mentioned is shown in broken lines in FIG. 4, i.e. a scraper disc 15 which can be mounted on the shaft of motor 2 via a hub 14. To use the scraper, the products must be brought against disc 15 when it rotates. This can be done in a known manner by means of a chute 13 into which a pusher 16 can be inserted.

As in all embodiments, the magnetic working contact is preferably an "I.L.S." type contactor, also known as a Reed relay of the kind manufactured by Messrs R.T.C. LA RADIOTECHNIQUE-COMPELEC, references RI 22 3A, RI 22 AA or RI 42.

The previously-described embodiment has the advantage of not having any parts which move when switch 11 is opened or closed. Note that the device is mounted on a means comprising a base 1 bearing a first element (bowl 3). A second element (cover 10) can be locked in a fixed position so that magnet 12, the axis of duct 7 and the magnetic working contact 11 are in line; in the latter case the magnet is secured to the cover.

FIGS. 5-8 illustrate another embodiment in which the locking information is as before transmitted by a rod of ferromagnetic material. In FIGS. 5-8, magnet 12 is secured not to the cover but to the pusher which penetrates into chute 13.

Figure 5:
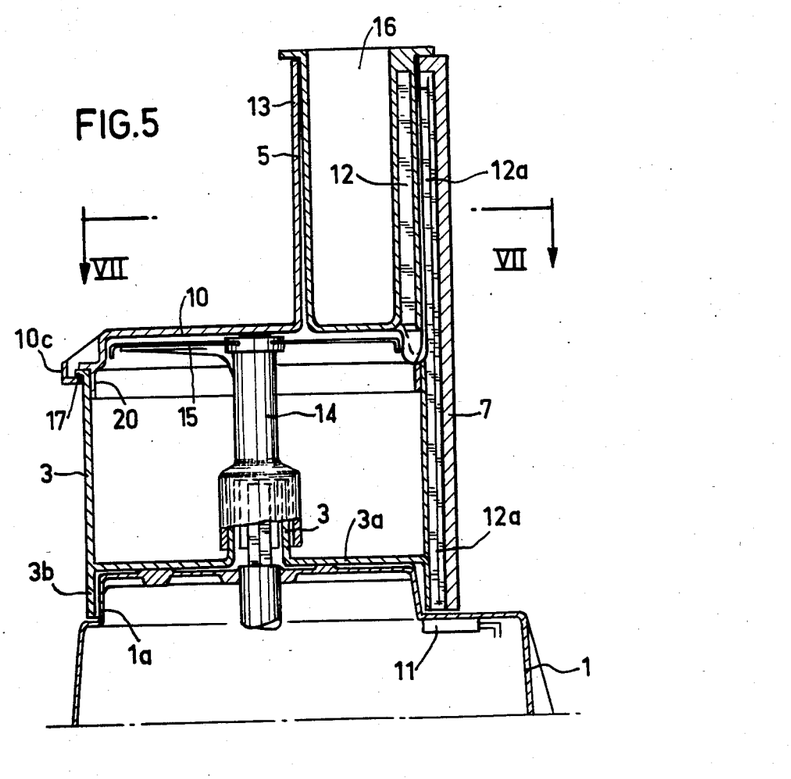
FIG. 5 is a view in vertical section of a device in which the motor is started by inserting a pusher into a chute.
Figure 7:
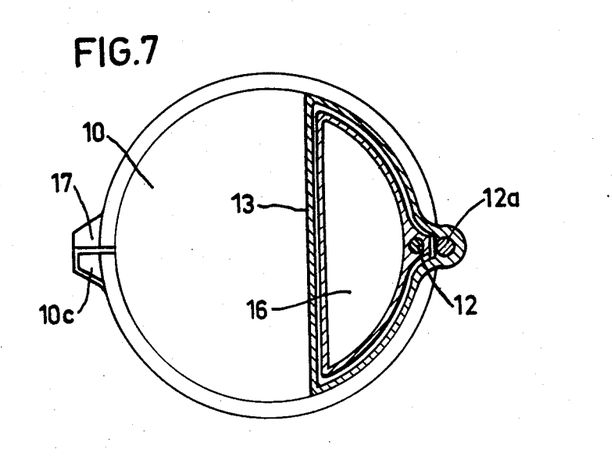
FIG. 7 is a top view of the device shown in FIG. 5.
Figure 8:
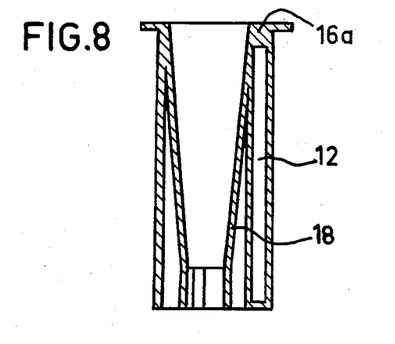
FIG. 8 is a vertical section of a pusher.

FIG. 5 is a view in section in a vertical plane of a food processor or kitchen robot of the previously-described kind. FIG. 7 is a top view of the same device, in section along line VII—VII of FIG. 5. FIG. 5 shows a base 1, bowl 3 and cover 10 surmounted by a chute 13 for inserting products and containing a pusher 16 for pushing the products downwards, without any possible contact between the hand and the rotating tool 15. As before, the bowl can be locked to the base by a bayonet fitting or a screw thread, for example, in a given position in which duct 7 is aligned with the actuating contact 11, which is included in the base. Cover 10 is locked by stops 17, which are moulded integrally with the bowl and at the top thereof, above flanges 10a, 10c formed in the cover. A stop 17 is shown in FIG. 7. The stop co-operates with a diametrically opposite stop (not shown in FIG. 7) to define a given position of the cover on the bowl and consequently define a given position of the cover relative to the base.

According to the invention, bowl 3 has a duct 7 along one of its generatrices, the duct containing a rod 12a of ferromagnetic material such as soft iron. When the bowl is mounted on the base as shown in FIG. 5, the bottom end of rod 12a is opposite a magnetic switch 11, disposed immediately below the flat surface 1b of face 1. In the embodiment in FIG. 5, duct 7 extends above bowl 3 and is substantially equal in height to the sum of the heights of bowl 3, cover 10 and chute 13. Pusher 16 has a permanent magnet 12 having a strong field (e.g. 40,000 Gauss) along one of its side walls.

The mode of operation of the device is self-evident. When pusher 16 is inserted into chute 13, magnet 12 comes opposite rod 12a and magnetically polarizes it. The polarization is transmitted to the bottom part of rod 12a and acts on contactor 11, thus closing it and enabling the motor to start, since it is connected to the motor supply circuit. As shown in FIG. 7, contactor 11 cannot be actuated unless magnet 12 is exactly opposite the rod, i.e. unless the cover is locked on the bowl.

This feature provides a considerable advantage. For safety reasons, the dimensions of known chutes must be such that is impossible to insert a hand or even a finger, since the height of the chute is greater than the length of a finger. Consequently, existing chutes are high and have a small cross-section which makes it difficult to scrape certain vegetables, since they first have to be cut into small pieces. As a result of the invention, the cross-section of the chute can be increased as much as required for cooking, since it is the pusher itself which starts the motor when inserted in the chute. Consequently, neither the hand or any part of it can come in contact with the rotating tool. As shown in FIG. 7, the cross-section of chute 13 has been considerably increased. Rod 12a can also be protected from any external magnetic influence by disposing a magnetic screen, e.g. of μ metal, inside duct 7a round its entire periphery except the region opposite magnet 12.

Figure 6:
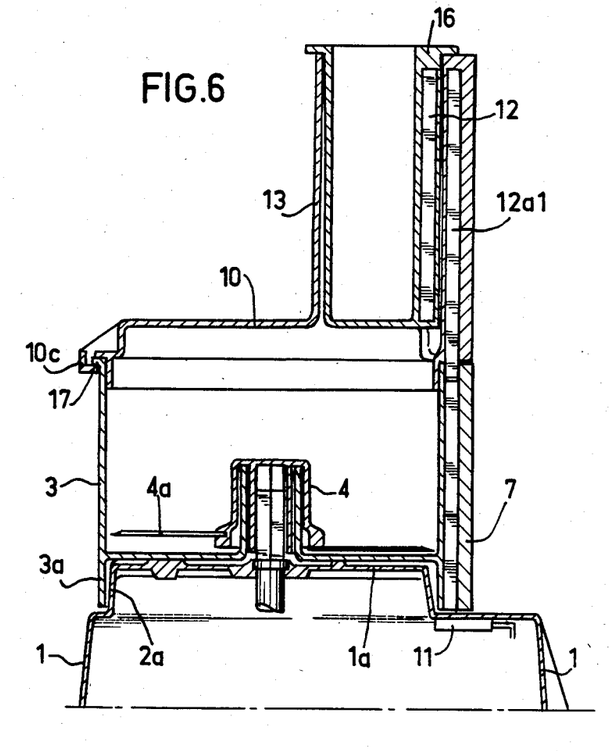
FIG. 6 shows an embodiment similar to FIG. 5, likewise in vertical section.

FIG. 6 shows an embodiment in which, in order to simplify certain manufacturing problems, rod 12a is divided into two parts, i.e. a part 12a1 secured to cover 10 and a part 12a2 secured to bowl 3. The two parts can be directly moulded on the bowl or cover or can be secured thereto after moulding. If elements 3 and 10 are properly mounted, the rod parts 12a1 and 12a2 are brought in line with one another and 12a1 is polarized by magnet 12, thus polarizing 12a2 and consequently changing the state of contactor 11. In the case where knives are used, all the ingredients may be introduced into the bowl before it is closed by the cover, and the motor can be started by inserting pusher 16 into chute 13. In such cases the pusher serves only as a safety closure means. It may happen, however, that products have to be inserted during operation of the device without stopping it. In such cases it is possible to use a "pusher" 16a fitted with a magnet 12 but having a funnel-shaped internal wall such as the wall 18 of pusher 16a shown in FIG. 8. Wall 18 is designed for inserting liquid or pulverulent products but prevents a finger being inserted.

In the case of high elements, however, the reluctance of the resulting magnetic circuit may be too powerful for perfectly reliable operation, in which case the safety device will not be inactivated when the aforementioned conditions are fulfilled.

Figure 9:
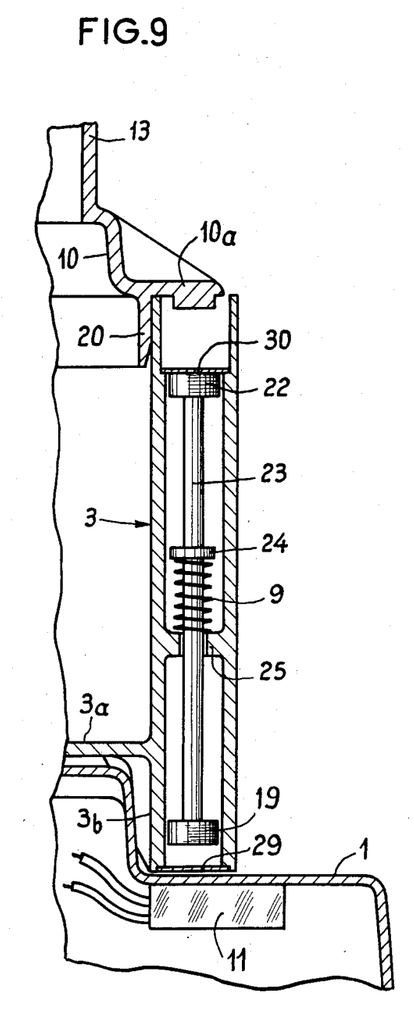
FIGS. 9 and 10 show the two positions of a device according to the invention involving the movement of a rod, which is mounted on apparatus of a kind common to all the embodiments.
Figure 10:
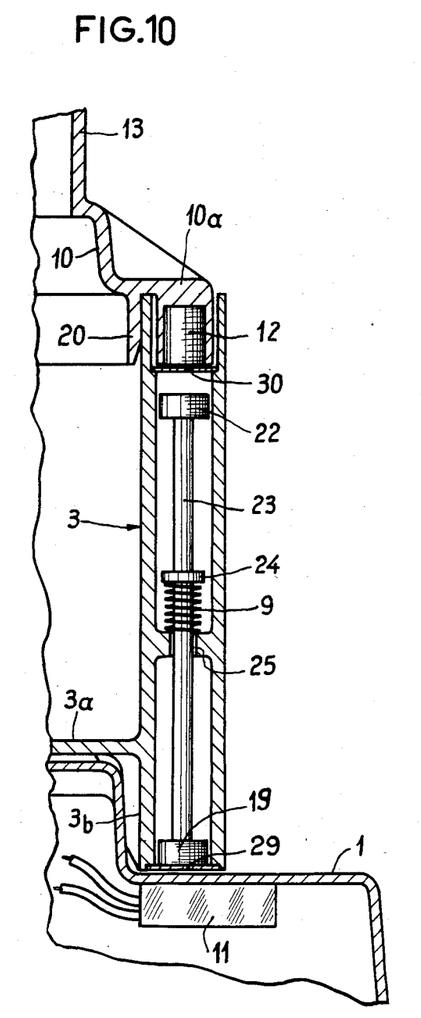

The following description relates to means for obviating this disadvantage. FIGS. 9 and 10 show two states of a single safety device according to the invention, applied as before to a food processor, only part of which is shown in the drawing. As before, FIGS. 9 and 10 show a base 1, a vessel 3 and a cover 10 surmounted by a chute 13. The drawings are sections in a vertical plane extending through the axis of the bowl and the axis of duct 7. As a result the permanent magnet 12 is shown only in FIG. 10. As in a preceding embodiment, magnet 12 is secured to a flange 10a on cover 10. However, the ferromagnetic rod in duct 7, which as before is positioned above the magnetic working contact 11, is replaced by a mobile assembly comprising a rod 23 bearing permanent magnets at both ends, i.e. a magnet 19 at the bottom end and a magnet 22 at the top end. Duct 7 is locked at the bottom and top by thin covers 29, 30 respectively. Rod 23 is slidably mounted by any appropriate means inside duct 7 and between walls 29 and 30. The central part of rod 23 has a collar 24 abutting an end of a return spring 9 which also bears against a ring 25 formed inside duct 7. According to a feature of the last-mentioned embodiment, the facing poles of magnets 12 and 22 have the same polarity, i.e. if the north pole of magnet 12 is at the bottom, the north pole of magnet 22 will be at the top or vice versa.

Operation of this device is very simple:

In FIG. 9, the bowl is locked on the base but the cover is not locked on the bowl. Magnet 12 does not exert any action on magnet 22, and spring 9 presses the top surface of magnet 22 against wall 30.

When cover 10 is rotated on bowl 3, guided by the inner skirt 20, the cover is locked and magnet 12 is brought above duct 7. Magnets 12 and 22 repel one another, thus lowering the rod assembly. As shown in FIG. 10, spring 9 is compressed as a result and magnet 19 comes in contact with wall 29. The air gap between magnet 19 and the magnetic element of the contactor is small, so that contactor 11 changes state and closes the motor supply circuit. As soon as the cover is unlocked, spring 9, which was compressed during the descent of rod 23, expands and returns magnet 22 to the top position, so that magnet 19 moves away from contactor 11 and opens the motor supply circuit. Ring 25 can guide the aforementioned movements and the magnets can bear very slightly against the inner walls of duct 7.

Figure 11:
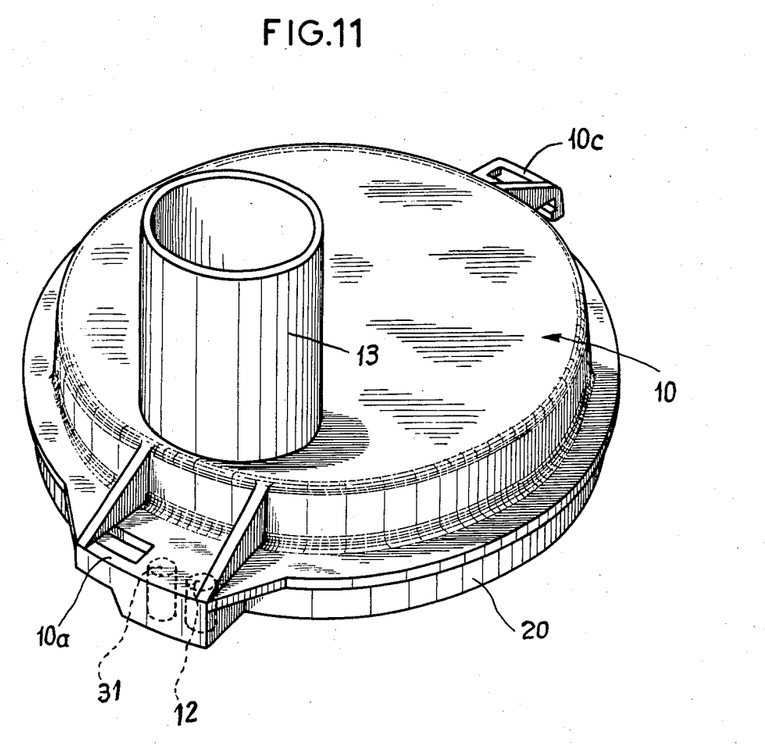
FIG. 11 is a view of the cover in the embodiment shown in FIGS. 12 and 13.
Figure 12:
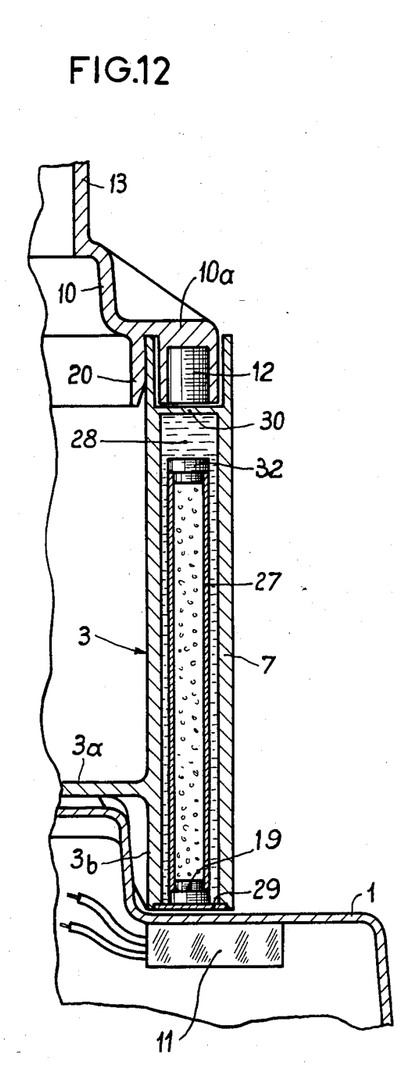
FIGS. 12 and 13 show the two positions (operative and inoperative) of another device according to the invention.
Figure 13:
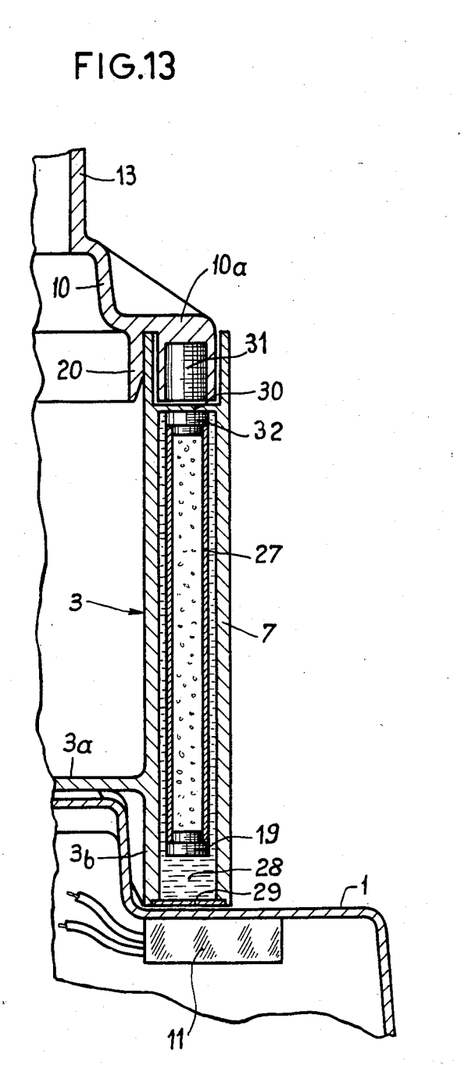

Another embodiment is shown in FIGS. 11-13. FIG. 11 is a perspective view of the cover 10 of a device fitted with a means according to the invention. At its periphery there are two diametrically opposite lugs or flanges 10a and 10c. Flange 10c is bent into a "U" so as to surround a stop borne by bowl 3, when the cover rotates. The same feature is applied to lug 10a, which also abuts an edge of the bowl (not shown in the drawing) so as to limit the angular motion of the cover on the bowl. The cover also bears two vertical magnets 12 and 31 secured to flange 10a and having poles disposed head to tail, i.e. if the south pole of magnet 12 is at the bottom the south pole of magnet 31 is at the top and vice versa.

FIG. 12 is a partial section in a vertical plane extending through the axis of bowl 3 and the axis of duct 7. As before, the safety device comprises a magnetic working contact 11 disposed below duct 7. In FIG. 12, however, the movable assembly comprises a tube 27 filled with gas, e.g. air, and closed at both ends by magnets 19 (bottom) and 32 (top). Inside duct 7 the assembly is immersed in a liquid 28 such as oil having a density such that tube 27 is substantially in neutral balance, since the Archimedean thrust is of the same order as the weight of the tube. As shown in FIG. 11, there are two positions of the cover, corresponding to the cases when magnet 12 or magnet 31 is brought above duct 7. In the case shown in FIG. 12, the cover is in the locked position and magnet 12 is above duct 7. The polarities of magnets 12 and 32 are identical and consequently, as a result of magnetic repulsion, tube 27 is pushed downwards and brings magnet 19 towards contactor 11, which changes state and closes the motor supply circuit. When, after using the device, the cover is turned so as to unlock it and extract the products from bowl 3, magnet 12 is replaced at the top of duct 11 by magnet 31 which, since it has the opposite polarity from magnet 12, also has the opposite polarity from magnet 32. Consequently magnetic repulsion is replaced by magnetic attraction. Tube 27 rises and magnet 19 moves away from contactor 11, which breaks the contact and stops the motor. Note that the rotation which replaces magnet 12 by magnet 31 also releases flanges 10a and 10c from stops 17.

In another embodiement, the cover need have only a single magnet having a polarity such that its pole is of the same nature as the pole of the facing magnet 22. In that case, however, the density of liquid 28 and/or the weight of the tube must be such that tube 27 rises through simple pressure and in the absence of any magnetic force, thus automatically breaking the magnetic connection between 19 and 11.

The description of the last-mentioned embodiment relates to the case where the actuating magnet 12 is secured in cover 10, but of course it can be usefully applied to the case where the motor is enabled to start by inserting a pusher into the chute.

In the examples which have been described and shown, reference has been made hitherto to only a single magnetic relay, contractor or switch. Of course, according to the invention, more than one contactor can be connected in series in the motor supply circuit. For example, a safety switch for the cover and a safety switch for the chute can be supplied. A safety switch for the bowl position can also be connected in series.

Finally, in the case where the motor is disposed not below the bowl but parallel thereto in a casing, the invention may be applied even more advantageously in view of the proximity of the bowl, cover and chute to the casing, inside which one or more contactors can be disposed.

Of course, the invention is in no case limited to the examples which have been described and shown.

We claim:

1. A magnetic safety device in combination with a food processor comprising a base, an electric motor enclosed by the base, an electric control circuit for the motor, a working vessel including a bowl and a cover removably locked on the bowl, an means for locking the bowl on the base in a working position, the safety device comprising a magnetically controlled working contact mounted inside the base and connected to the electric control circuit, a duct integral with the bowl and extending along a generatrix of the bowl, said duct containing a rod made of ferromagnetic material extending fixedly therein, such that when the bowl is locked on the base in a working position, a lower end of the rod is adjacent to and facing the working contact, and a permanent magnet secured to the cover, such that when the cover is locked on the bowl, the magnet is adjacent to and facing an upper end of the rod.

2. A magnetic safety device in combination with a food processor comprising a base, an electric motor enclosed by the base, an electric control circuit for the motor, a working vessel including a bowl and cover removably locked on the bowl, the cover including a chute, means for locking the bowl on the base in a working position, and a pusher for pressing inserted products into the chute, the safety device comprising a duct extending along a generatrix of the bowl, a magnetically controlled working contact connected with the electric control circuit for the motor and mounted to the base so as to be disposed under the duct in working position of the bowl, a permanent magnet secured to the pusher and a magnetic circuit adapted to convey the flux introduced by the permanent magnet, when the pusher is inserted into the chute, to the magnetically controlled working contact.

3. A magnetic safety device according to claim 2 wherein the magnetic circuit comprises a rod of magnetic material extending along the duct, the duct extending between the base and the top of the chute.

4. A magnetic safety device according to claim 2 wherein the magnetically controlled circuit comprises two rods of ferromagnetic material, one secured to the bowl and the other to the cover, the two rods coming in line with the magnetically controlled working contact when the bowl is locked to the base and the cover is locked to the bowl, thus magnetically coupling the permanent magnet to the magnetically controlled working contact.

5. A magnetic safety device according to claim 2 wherein the pusher has a cross-section which is such that when the pusher is inserted in the chute, the permanent magnet comes opposite and near the magnetic circuit.

6. A magnetic safety device according to claim 2 wherein the pusher has funnel-shaped inner walls for inserting products.

7. A magnetic safety device in combination with a food processor comprising a base, an electric motor enclosed by the base, an electric control circuit for the motor, a working vessel including a bowl and a cover removably locked on the bowl, and means for locking the bowl on the base in a working position the safety device comprising a duct extending along a generatrix of the bowl, a magnetically controlled working contact connected with the electric control circuit for the motor and mounted to the base so as to be disposed under the duct in the working position of the bowl, a mobile assembly slidably mounted inside the duct and having top and bottom ends, first and second magnets affixed to said top and bottom ends, respectively, a permanent magnet situated to be brought above the mobile assembly when said cover and bowl are locked, and the permanent and the first magnet having the same polarity so as to produce repulsion when the cover is locked on the bowl.

8. A magnetic safety device according to claim 7, wherein the mobile assembly comprises a rod and a spring for returning the rod to its top position.

9. A magnetic safety device according to claim 7 wherein the mobile assembly comprises a liquid disposed in the duct and a gas-filled tube immersed in the liquid.

10. A magnetic safety device according to claim 9 wherein said working vessel carries another permanent magnet mounted below said mobile assembly and parallel to the permanent magnet, the permanent magnets having opposite polarity so as to maintain the tube in neutral balance inside the duct.

11. A magnetic safety device in combination with a food processor comprising a base, an electric motor enclosed by the base, an electric control circuit for the motor, a working vessel including a bowl and a cover removably locked on the bowl, and means for locking the bowl on the base in a working position, the safety device comprising a duct extending along a generatrix of the bowl, a magnetically controlled working contact connected with the control circuit and mounted to said base so as to be under the duct in the working position of the bowl, the cover including a cam and the safety device further comprising a pusher slidably mounted inside the duct, the pusher having a top end engageable with said cam and a bottom end, a permanent magnet secured to the bottom end of the pusher, said permanent magnet modifying the state of the magnetically controlled working contact when the permanent magnet approaches or moves away from the magnetically controlled working contact under the action of said cam coming in and out of contact with the top end of the pusher.

12. A magnetic safety device according to claim 11 further comprising a second permanent magnet mounted to said working vessel and a second magnetically controlled working contacted connected in series with the first magnetically controlled contact in the electrical control circuit and mounted to said base so as to be under said second permanent magnet in the working position of the bowl.

13. A magnetic safety device for a food processor in accordance with claim 4 wherein said magnetically controlled working contact is a single working contact connected in said control circuit.

14. A magnetic safety device according to claim 11 wherein said contct is mounted within said base and the surface portion of said base above said contact is solid.

15. A magnetic safety device according to claim 14 wherein said surface portion is flat.

* * * * *

UNITED STATES PATENT AND TRADEMARK OFFICE
CERTIFICATE OF CORRECTION

PATENT NO. : 4,741,482

DATED : May 3, 1988

INVENTOR(S) : Coggiola et al.

It is certified that error appears in the above-identified patent and that said Letters Patent is hereby corrected as shown below:

Claim 1, line 5 (Col. 8, line 14), change "an" to --and--.

Claim 6, line 6 (Col. 9, line 2), after "position" insert --,--.

Claim 13, line 2 (Col. 10, line 26), change "4" to --11--.

Claim 14, line 2 (Col. 10, line 30), change "contct" to --contact--.

Signed and Sealed this

Thirtieth Day of August, 1988

Attest:

DONALD J. QUIGG

*Attesting Officer*     *Commissioner of Patents and Trademarks*